(12) United States Patent
Tanaka

(10) Patent No.: US 10,019,890 B2
(45) Date of Patent: Jul. 10, 2018

(54) SENSOR MANAGEMENT DEVICE, SENSOR MANAGEMENT METHOD, AND SENSOR MANAGEMENT PROGRAM

(71) Applicant: SUMITOMO ELECTRIC INDUSTRIES, LTD., Osaka-shi, Osaka (JP)

(72) Inventor: Yoshizo Tanaka, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/574,375

(22) PCT Filed: Jan. 25, 2016

(86) PCT No.: PCT/JP2016/051982
§ 371 (c)(1),
(2) Date: Nov. 15, 2017

(87) PCT Pub. No.: WO2016/185731
PCT Pub. Date: Nov. 24, 2016

(65) Prior Publication Data
US 2018/0137743 A1    May 17, 2018

(30) Foreign Application Priority Data
May 19, 2015  (JP) ................. 2015-101636

(51) Int. Cl.
| G08B 3/00 | (2006.01) |
| G08B 29/04 | (2006.01) |
| G08B 5/22 | (2006.01) |
| G06T 11/60 | (2006.01) |
| H04L 29/08 | (2006.01) |
| H04W 84/18 | (2009.01) |

(52) U.S. Cl.
CPC .............. *G08B 29/04* (2013.01); *G08B 5/22* (2013.01); *G06T 11/60* (2013.01); *H04L 67/12* (2013.01); *H04W 84/18* (2013.01)

(58) Field of Classification Search
CPC . G08B 29/04; G08B 5/22; H04Q 9/00; H04Q 2209/86; H04Q 2209/88
USPC ...................................... 340/691.6, 3.1, 5.1
See application file for complete search history.

(56) References Cited

U.S. PATENT DOCUMENTS

2017/0006435 A1*  1/2017  Yamamoto .............. H04W 4/70
2017/0013330 A1*  1/2017  Yamamoto .............. H04Q 9/00

FOREIGN PATENT DOCUMENTS

| EP | 2 143 239 A2 | 1/2010 |
| EP | 2 797 391 A1 | 10/2014 |
| JP | 2004-326623 A | 11/2004 |

(Continued)

*Primary Examiner* — Toan N Pham
(74) *Attorney, Agent, or Firm* — Drinker Biddle & Reath LLP

(57) ABSTRACT

A sensor management device according to an embodiment of the present invention includes: a display control unit configured to perform control of displaying position screen information indicating positions of sensors; and a detection unit configured to detect a sensor, wherein when a position of the sensor detected by the detection unit is not included in the position screen information, the display control unit further performs control of displaying identification information of the sensor detected by the detection unit.

14 Claims, 16 Drawing Sheets

(56) References Cited

FOREIGN PATENT DOCUMENTS

| | | | |
|---|---|---|---|
| JP | 2006-285636 | A | 10/2006 |
| JP | 2007-108884 | A | 4/2007 |
| JP | 2010-524094 | A | 7/2010 |
| JP | 2010-231659 | A | 10/2010 |
| JP | 2010-231660 | A | 10/2010 |
| JP | 2010-272065 | A | 12/2010 |
| JP | 5456414 | B2 | 3/2014 |
| JP | 2014-81860 | A | 5/2014 |
| JP | 2014-161121 | A | 9/2014 |

* cited by examiner

| IDENTIFICATION INFORMATION | MEASUREMENT VALUE | OBTAINMENT TIME |
|---|---|---|
| ABC1 | 27.5 | 2015 March 1, 15 hour 00 min 01 sec |
| ABC4 | 24.6 | 2015 March 1, 15 hour 00 min 05 sec |
| ABC7 | 24.7 | 2015 March 1, 15 hour 00 min 09 sec |
| ABC2 | 25.8 | 2015 March 1, 15 hour 00 min 13 sec |
| ABC5 | 24.7 | 2015 March 1, 15 hour 00 min 17 sec |
| ABC6 | 24.6 | 2015 March 1, 15 hour 00 min 21 sec |
| ABC3 | 26.1 | 2015 March 1, 15 hour 00 min 25 sec |
| ABC9 | 24.7 | 2015 March 1, 15 hour 00 min 29 sec |
| ABC8 | 24.6 | 2015 March 1, 15 hour 00 min 33 sec |

| IDENTIFICATION INFORMATION | POSITION INFORMATION |
|---|---|
| ABC1 | X=111, Y=222 |
| ABC2 | X=333, Y=222 |
| ABC3 | X=444, Y=111 |
| ABC4 | N |
| ABC5 | N |
| ABC6 | X=155, Y=255 |
| ABC7 | X=331, Y=332 |
| ABC8 | N |
| ABC9 | N |

TA20

| IDENTIFICATION INFORMATION | UPPER LIMIT VALUE | LOWER LIMIT VALUE |
|---|---|---|
| ABC1 | 80 | 80 |
| ABC2 | 80 | 80 |
| ABC3 | 80 | 80 |
| ABC4 | N | N |
| ABC5 | N | N |
| ABC6 | 80 | 80 |
| ABC7 | 80 | 80 |
| ABC8 | N | N |
| ABC9 | N | N |

| IDENTIFICATION INFORMATION | BASE STATION | RADIO WAVE INTENSITY | OBTAINMENT TIME |
|---|---|---|---|
| ABC1 | BASE STATION 14A | 111 | 2015 March 1, 15 hour 00 min 01 sec 02 |
| ABC1 | BASE STATION 14B | 222 | 2015 March 1, 15 hour 00 min 01 sec 25 |
| ABC1 | BASE STATION 14C | 333 | 2015 March 1, 15 hour 00 min 01 sec 47 |
| ABC4 | BASE STATION 14A | 155 | 2015 March 1, 15 hour 00 min 05 sec 02 |
| ABC4 | BASE STATION 14B | 255 | 2015 March 1, 15 hour 00 min 05 sec 25 |
| ABC4 | BASE STATION 14C | 355 | 2015 March 1, 15 hour 00 min 05 sec 47 |
| ABC3 | BASE STATION 14A | 111 | 2015 March 1, 15 hour 00 min 08 sec 02 |
| ABC3 | BASE STATION 14B | 333 | 2015 March 1, 15 hour 00 min 08 sec 25 |
| ABC3 | BASE STATION 14C | 111 | 2015 March 1, 15 hour 00 min 08 sec 47 |
| ABC2 | BASE STATION 14A | 255 | 2015 March 1, 15 hour 00 min 15 sec 02 |
| ABC2 | BASE STATION 14B | 432 | 2015 March 1, 15 hour 00 min 15 sec 25 |
| ABC2 | BASE STATION 14C | 321 | 2015 March 1, 15 hour 00 min 15 sec 47 |

| IDENTIFICATION INFORMATION | AVERAGE RADIO WAVE INTENSITY | | |
|---|---|---|---|
| | BASE STATION 14A | BASE STATION 14B | BASE STATION 14C |
| ABC1 | 111 | 111 | 333 |
| ABC1 | 222 | 222 | 222 |
| ABC1 | 333 | 333 | 355 |
| ABC4 | 111 | 155 | 111 |
| ABC4 | 255 | 255 | 333 |
| ABC4 | 111 | 355 | 222 |
| ABC3 | 255 | 111 | 333 |
| ABC3 | 222 | 333 | 444 |
| ABC3 | 333 | 222 | 321 |
| ABC2 | 155 | 111 | 333 |
| ABC2 | 255 | 333 | 444 |
| ABC2 | 355 | 222 | 321 |

TA62

SENSOR MANAGEMENT DEVICE, SENSOR MANAGEMENT METHOD, AND SENSOR MANAGEMENT PROGRAM

TECHNICAL FIELD

The present invention relates to a sensor management device, a sensor management method, and a sensor management program. In particular, the present invention relates to a sensor management device, a sensor management method, and a sensor management program which control displaying of the positions of sensors.

BACKGROUND ART

Various technologies for monitoring the state of a predetermined area have been developed. For example, Japanese Patent No. 5456414 (PATENT LITERATURE 1) discloses the following technology: an area-monitoring display method in which values or changed values regarding at least one kind of certain events are measured by a plurality of sensors arranged at various places in a monitoring target area, data obtained through the measurement is processed, and the processed results are displayed on a monitor screen, wherein the processed results are displayed so as to overlap an area display indicating the monitoring target area, and the positions of the processed results displayed on the area display on the monitor screen are set to be the positions that correspond or substantially correspond to the arrangement places of the sensors with respect of which the processed results have been obtained. In the area-monitoring display method, a circular shape is used as a display shape of each processed result, the center of the displayed circular shape indicates the measurement place, the size of the circular shape indicates the magnitude (absolute value) of the measurement value, and the color of the circular shape is translucent such that the processed result displayed so as to overlap the measurement place on the display of the monitoring target area can be seen.

CITATION LIST

Patent Literature

PATENT LITERATURE 1: Japanese Patent No. 5456414

SUMMARY OF INVENTION

Technical Problem

In a state where the position of a sensor in the predetermined area is displayed on the screen by use of the technology described in PATENT LITERATURE 1, if the measurement value of the sensor has shown an abnormality, a user can move to the installation place of the sensor, and can directly confirm the state of the monitoring target monitored by the sensor, for example.

However, in a case where the sensors installed in the predetermined area include a sensor of which position is unknown, the position of the sensor is not displayed on the screen. In such a case, even if the user recognizes that there is an abnormality in the measurement value of the sensor, it is difficult for the user to move to the installation place of the sensor.

The present invention has been made in order to solve the above-described problem. An object of the present invention is to provide a sensor management device, a sensor management method, and a sensor management program which can appropriately manage the positions of sensors.

(1) In order to solve the above problem, a sensor management device according to an aspect of the present invention includes: a display control unit configured to perform control of displaying position screen information indicating positions of sensors; and a detection unit configured to detect a sensor, wherein when a position of the sensor detected by the detection unit is not included in the position screen information, the display control unit further performs control of displaying identification information of the sensor detected by the detection unit.

(9) In order to solve the above problem, a sensor management method according to an aspect of the present invention is a sensor management method to be performed in a sensor management device, the sensor management method including the steps of: performing control of displaying position screen information indicating positions of sensors; detecting a sensor; and performing control of displaying identification information of the detected sensor when a position of the detected sensor is not included in the position screen information.

(10) In order to solve the above problem, a sensor management program according to an aspect of the present invention is a sensor management program to be used in a sensor management device, the sensor management program causing a computer to perform the steps of: performing control of displaying position screen information indicating positions of sensors; detecting a sensor; and performing control of displaying identification information of the detected sensor when a position of the detected sensor is not included in the position screen information.

The present invention can not only be realized as a sensor management device provided with such a characteristic processing unit, but can also be realized as a semiconductor integrated circuit that realizes a part or the entirety of the sensor management device, or as a system that includes the sensor management device.

Advantageous Effects of Invention

According to the present invention, the positions of sensors can be appropriately managed.

BRIEF DESCRIPTION OF DRAWINGS

FIG. 5 shows one example of a measurement result list K stored in a storage unit of the sensor management device according to the first embodiment of the present invention.

FIG. 6 shows one example of a position list P stored in the storage unit of the sensor management device according to the first embodiment of the present invention.

FIG. 14 shows one example of a radio wave intensity list M stored in the storage unit of the sensor management device according to the second embodiment of the present invention.

FIG. 15 shows one example of an average intensity list Ma stored in the storage unit of the sensor management device according to the second embodiment of the present invention.

DESCRIPTION OF EMBODIMENTS

Figure 1:
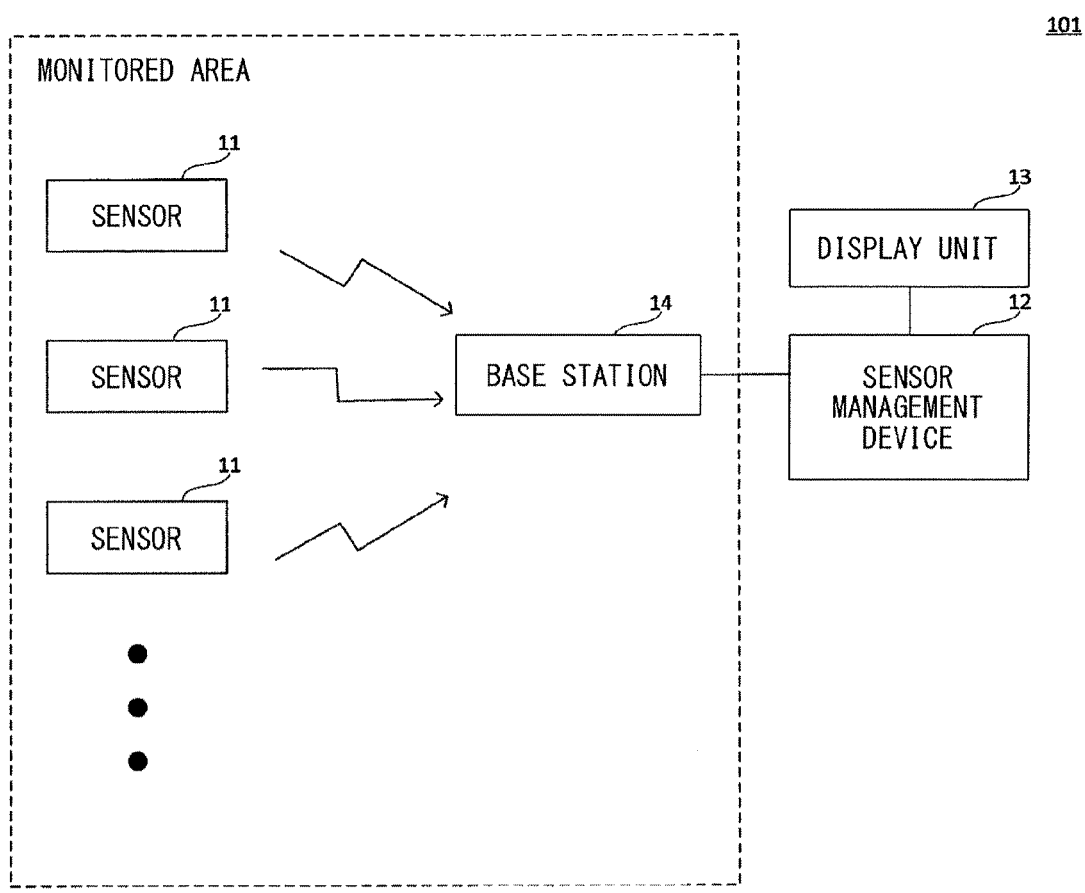
FIG. 1 shows a configuration of a monitoring system according to an embodiment of the present invention.

First, the contents of embodiments of the present invention will be listed and described.

(1) A sensor management device according to an embodiment of the present invention includes: a display control unit configured to perform control of displaying position screen information indicating positions of sensors; and a detection unit configured to detect a sensor, wherein when a position of the sensor detected by the detection unit is not included in the position screen information, the display control unit further performs control of displaying identification information of the sensor detected by the detection unit.

Thus, through the configuration in which, when a sensor of which position has not been ascertained in the sensor management device is detected, identification information of the sensor is displayed on the screen, the user can recognize, on the screen, the presence of the sensor of which position is not ascertained. Thus, for example, the user can take measures necessary for ascertaining the position of the sensor. Accordingly, the position of the sensor can be appropriately managed.

(2) Preferably, the sensor management device further includes an obtainment unit configured to obtain operation information indicating an operation for designating a position of a sensor, wherein the display control unit performs control of displaying the position screen information on the basis of the operation information obtained by the obtainment unit.

Through this configuration, the sensor management device can recognize the position of a sensor, and can cause the recognized position of the sensor to be displayed on the screen. For example, the position of a sensor of which position is not ascertained in the sensor management device can be added to the screen.

(3) Preferably, the sensor management device further includes an abnormality detection unit configured to detect an abnormality of a sensor, wherein the display control unit sets a display mode for a position of a sensor for which an abnormality has been detected by the abnormality detection unit, among the positions included in the position screen information, to a display mode that is different from a display mode for positions of sensors for which no abnormality has been detected by the abnormality detection unit.

Through this configuration, in a case where there is an abnormality in the measurement result of a sensor, the user can easily recognize the position of the sensor. Accordingly, the user can promptly move to the installation place of the sensor, and can directly confirm the state of the monitoring target monitored by the sensor.

(4) Preferably, the sensor management device further includes a movement detection unit configured to detect movement of a sensor, wherein the display control unit sets a display mode for a position of a sensor of which movement has been detected by the movement detection unit, among the positions included in the position screen information, to a display mode that is different from a display mode for positions of sensors of which movement has not been detected by the movement detection unit.

Through this configuration, for example, when a user has moved a sensor, other users can easily recognize that the sensor has been moved.

(5) More preferably, the display control unit performs control of displaying the position screen information further indicating a movement origin and a movement destination of the sensor.

Through this configuration, the user can recognize the detailed content of the movement of the sensor.

(6) Preferably, the display control unit further performs control of displaying information regarding a designated sensor among the sensors of which positions are indicated by the position screen information.

Through this configuration, the user can easily confirm the measurement result and the like of the desired sensor.

(7) Preferably, the display control unit performs control of displaying the position screen information further indicating a position of the sensor management device.

Through this configuration, for example, in a case where the user is near the sensor management device, if the user confirms the positional relationship between a sensor and the sensor management device displayed on the screen, the user can more easily recognize the position of the sensor.

(8) Preferably, the display control unit updates the display of the identification information when a predetermined operation has been performed.

Through this configuration for example, the frequency of updating the display of identification information by the sensor management device can be reduced, and thus, the processing load of the sensor management device can be reduced.

(9) A sensor management method according to an embodiment of the present invention is a sensor management method to be performed in a sensor management device, the sensor management method comprising the steps of: performing control of displaying position screen information indicating positions of sensors; detecting a sensor; and performing control of displaying identification information of the detected sensor when a position of the detected sensor is not included in the position screen information.

Thus, through the configuration in which, when a sensor of which position has not been ascertained in the sensor management device is detected, identification information of the sensor is displayed on the screen, the user can recognize, on the screen, the presence of the sensor of which position is not ascertained. Thus, for example, the user can take measures necessary for ascertaining the position of the sensor. Accordingly, the position of the sensor can be appropriately managed.

(10) A sensor management program according to an embodiment of the present invention is a sensor management program to be used in a sensor management device, the sensor management program causing a computer to perform the steps of: performing control of displaying position screen information indicating positions of sensors; detecting a sensor; and performing control of displaying identification information of the detected sensor when a position of the detected sensor is not included in the position screen information.

Thus, through the configuration in which, when a sensor of which position has not been ascertained in the sensor management device is detected, identification information of the sensor is displayed on the screen, the user can recognize, on the screen, the presence of the sensor of which position is not ascertained. Thus, for example, the user can take measures necessary for ascertaining the position of the sensor. Accordingly, the position of the sensor can be appropriately managed.

Hereinafter, embodiments of the present invention will be described with reference to the drawings. In the drawings, the same or corresponding parts are denoted by the same reference signs, and description thereof is not repeated. At least some parts of the embodiment described below can be combined together as desired.

First Embodiment

[Configuration and Basic Operation]

FIG. 1 shows a configuration of a monitoring system according to an embodiment of the present invention.

With reference to FIG. 1, a monitoring system 101 includes a plurality of sensors 11; a sensor management device 12, a display unit 13, and a base station 14.

Each sensor 11 includes a battery, and operates by electric power supplied from the battery, for example. Each sensor 11 is installed in a monitored area such as a plant or a hospital, and performs measurement regarding a monitoring target, such as measurement of temperature, humidity, or electric current of the monitoring target, for example.

Each sensor 11 periodically or not periodically creates sensor information which includes: ID (identification) of the sensor 11 itself, i.e., identification information; and measurement result information indicating a measurement result, and wirelessly transmits the created sensor information to the base station 14 in accordance with a communication mode such as wireless LAN (local area network) or wireless PAN (personal area network), for example.

The base station 14 is a base station in the wireless LAN, the wireless PAN, or the like installed in the monitored area, for example, and transmits the sensor information received from each sensor 11 to the sensor management device 12 through wired communication, for example. The base station 14 may be configured to transmit the sensor information received from each sensor 11 to the sensor management device 12 through wireless communication.

The sensor management device 12 receives the sensor information of each sensor 11 from the base station 14, and performs control of displaying, on the display unit 13, the content based on each piece of received sensor information.

The sensor management device 12 and the display unit 13 may be provided in the monitored area or may be provided outside the monitored area.

The monitoring system 101 may include a plurality of the base stations 14. In addition, the sensor management device 12 may include the display unit 13.

Figure 2:
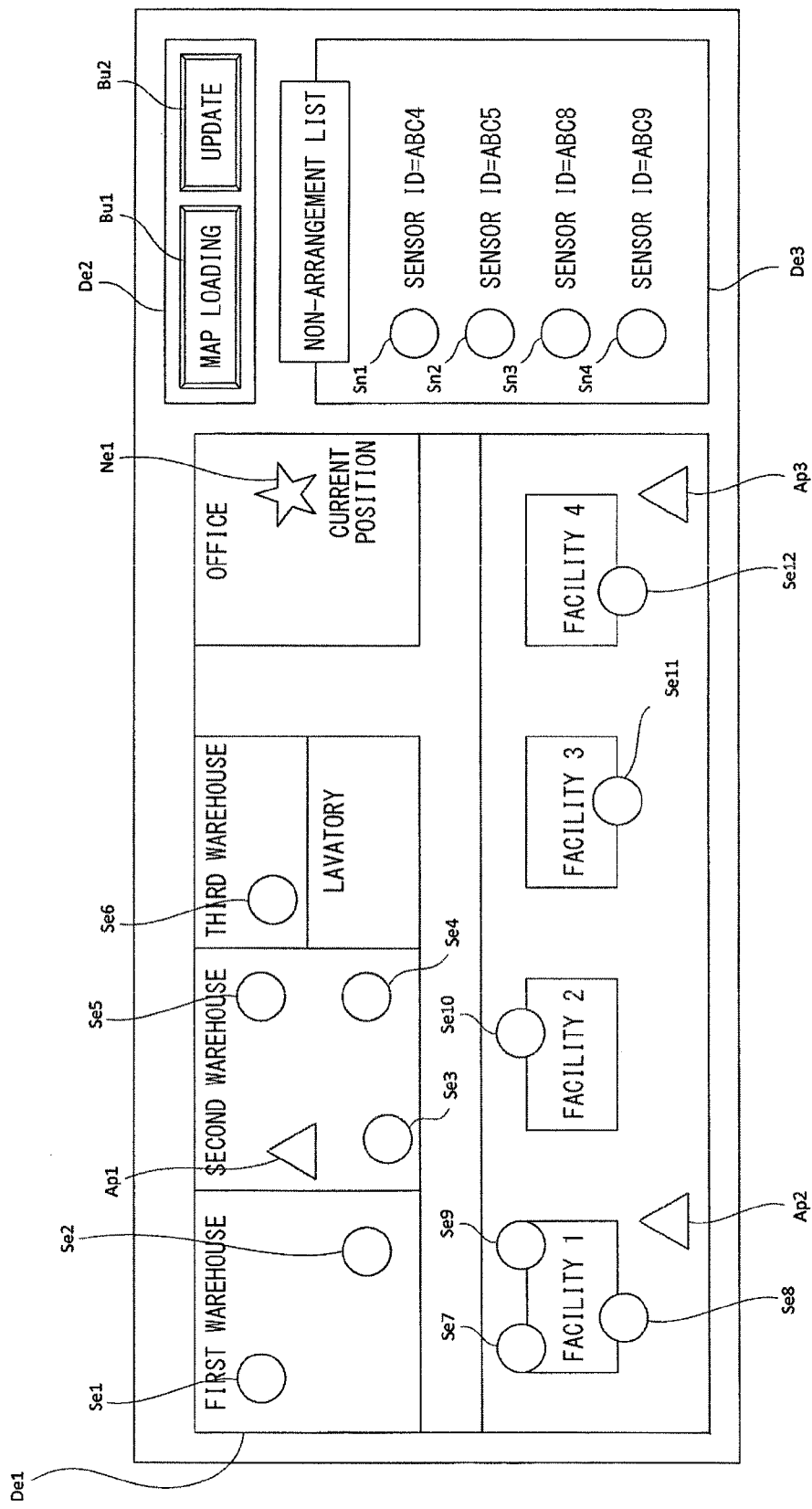
FIG. 2 shows one example of a screen displayed on a display unit in a monitoring system according to a first embodiment of the present invention.

FIG. 2 shows one example of a screen displayed on the display unit in the monitoring system according to the first embodiment of the present invention.

With reference to FIG. 2, the screen includes a position display area De1, a button display area De2, and a non-arrangement display area De3.

In the position display area De1, an image showing a map of a monitored area (hereinafter also referred to as map image) is displayed.

In the position display area De1, sensor icons Se1 to Se12 that respectively correspond to a plurality of sensors 11 arranged in the monitored area, base station icons Ap1 to Ap3 that respectively correspond to a plurality of the base stations 14 arranged in the monitored area, and a device icon Ne1 that corresponds to the sensor management device 12 arranged in the monitored area are displayed.

Specifically, the sensor icons Se1 to Se12, the base station icons Ap1 to Ap3, and the device icon Ne1 are displayed on the map image of the monitored area.

The sensor icons Se1 to Se12 indicate the positions of the corresponding sensors 11 in the monitored area. That is, the arrangement of the sensor icons Se1 to Se12 on the map image corresponds to the arrangement of the corresponding sensors 11 in the monitored area.

The base station icons Ap1 to Ap3 indicate the positions of the corresponding base stations 14 in the monitored area. That is, the arrangement of the base station icons Ap1 to Ap3 on the map image corresponds to the arrangement of the corresponding base stations 14 in the monitored area. The device icon Ne1 indicates the position of the sensor management device 12 in the monitored area.

Hereinafter each of the sensor icons Se1 to Se12 will also be referred to as sensor icon Se, and each of the base station icons Ap1 to Ap3 will also be referred to as base station icon Ap.

The sensor management device 12 has stored therein position information indicating the position of each sensor 11, position information indicating the position of each base station 14, and position information indicating the position of the sensor management device 12.

On the basis of these pieces of position information stored in the sensor management device 12, the sensor management device 12 displays each sensor icon Se, each base station icon Ap, and the device icon Ne1 at their corresponding places on the map image, respectively.

In the non-arrangement display area De3, a "non-arrangement list" is displayed. In the non-arrangement list, identification information of sensors 11 of which position information has not been obtained by the sensor management device 12 is displayed.

Specifically, in the non-arrangement list, identification numbers of sensors 11 of which position information has not been obtained by the sensor management device 12, and sensor icons Sn1 to Sn4 that respectively correspond to these sensors 11 are displayed.

Hereinafter, each of the sensor icons Sn1 to Sn4 will also be referred to as sensor icon Sn. The user drags and drops a sensor icon Sn displayed in the non-arrangement display area De3, to the position display area De1 by use of a mouse or the like, thereby arranging the sensor icon Sn on the map image, for example.

Specifically, the user ascertains the position in the monitored area of a sensor 11 that corresponds to a sensor icon Sn displayed in the non-arrangement display area De3, and then, arranges the sensor icon Sn at the corresponding place on the map image.

Hereinafter, the operation of arranging a sensor icon Sn displayed in the non-arrangement display area De3, to the corresponding place on the map image will also be referred to as icon arranging operation.

When an icon arranging operation has been performed on a sensor icon Sn displayed in the non-arrangement display area De3, the sensor management device 12 obtains the coordinates of an arrangement destination in the map image of the sensor icon Sn, as position information of the sensor 11 that corresponds to the sensor icon Sn.

The sensor icon Sn arranged on the map image as a result of the icon arranging operation by the user becomes a sensor icon that corresponds to the sensor icon Se.

For example, when the user has clicked a sensor icon Se in the position display area De1, a new window is displayed on the screen. In the window, information regarding the sensor 11 that corresponds to the sensor icon Se clicked by the user, e.g., a measurement result by the sensor 11, is displayed.

In the button display area De2, a button Bu1 indicated as "map loading", and a button Bu2 indicated as "update" are displayed.

At the time of initial setting of the sensor management device 12, for example, in order to cause a map image of the monitored area to be displayed in the position display area De1, the user needs to cause the sensor management device 12 to load the map image.

The sensor management device 12 obtains in advance map images through a network or a USB memory, for example. When the user clicks the button Bu1, a window for selecting a map image is displayed on the screen. When the user selects a map image of the monitored area in the window, the sensor management device 12 loads the map image selected by the user, and displays the loaded map image in the position display area De1.

Meanwhile, when updating the content of the non-arrangement list in the non-arrangement display area De3, the user clicks the button Bu2.

Figure 3:
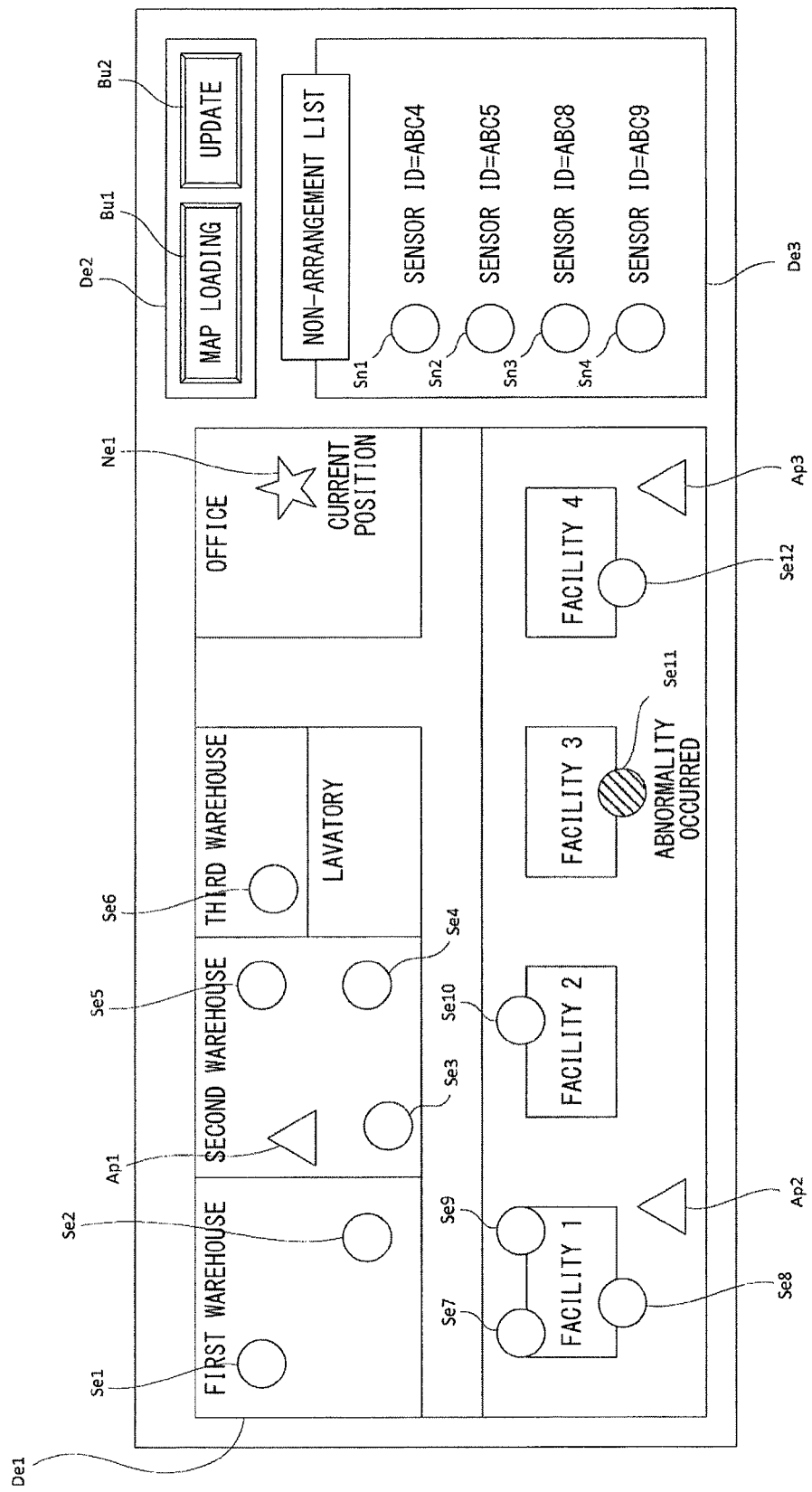
FIG. 3 shows another example of the screen displayed on the display unit in the monitoring system according to the first embodiment of the present invention.

FIG. 3 shows another example of the screen displayed on the display unit in the monitoring system according to the first embodiment of the present invention.

With reference to FIG. 3, a sensor icon Se11 is displayed in a color that is different from the color used in the ordinary display. In addition, the characters "abnormality occurred" are attached to the sensor icon Se11.

On the basis of a measurement result of a sensor 11, the sensor management device 12 detects that an abnormality has occurred in the monitoring target of the sensor 11. When the sensor management device 12 has detected the occurrence of the abnormality, the sensor management device 12 changes the display mode of the corresponding sensor icon Se, thereby notifying the user that an abnormality has occurred in the monitoring target of the sensor 11.

Figure 4:
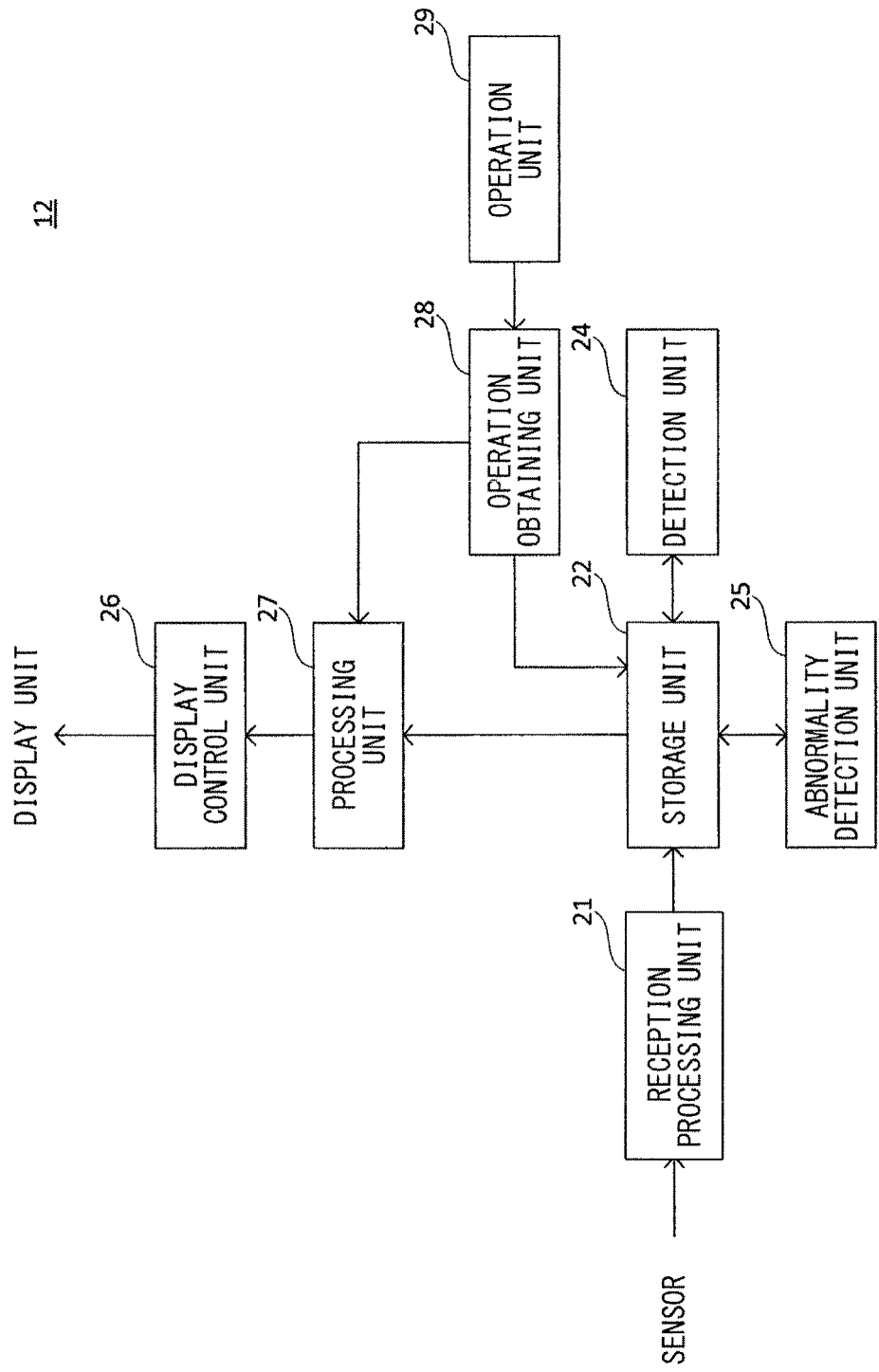
FIG. 4 shows a part of a configuration of a sensor management device according to the first embodiment of the present invention.

FIG. 4 shows a part of a configuration of the sensor management device according to the first embodiment of the present invention.

With reference to FIG. 4, the sensor management device 12 includes a reception processing unit 21, a storage unit 22, a detection unit 24, an abnormality detection unit 25, a display control unit 26, a processing unit 27, an operation obtaining unit (obtainment unit) 28, and an operation unit 29. The reception processing unit 21, the detection unit 24, the abnormality detection unit 25, the display control unit 26, the processing unit 27, and the operation obtaining unit 28 are each implemented by a processor, such as a CPU (central processing unit) or an MPU (micro-processing unit), that performs digital signal processing, for example. Each of these units may be implemented by one processor, or may be implemented by separate processors. The storage unit 22 is implemented by a memory such as a RAM (random access memory) or a flash memory, for example. The operation unit 29 is implemented by a pointing device such as a mouse, a trackball, a touchpad provided to the display unit 13, which correspond to GUI (graphical user interface), for example.

The storage unit 22 has stored therein various types of information that are necessary for the sensor management device 12 to perform display processing for the screen.

Specifically, for example, the storage unit 22 has stored therein: a measurement result list K indicating the content of sensor information obtained from each sensor 11; a position list P indicating the position of each sensor 11; a normal range list T indicating the normal range of the measurement value obtained by each sensor 11; an abnormality presence/absence list U indicating the presence/absence of an abnormality in the monitoring target of each sensor 11; position information indicating the position of each base station 14; position information indicating the position of the sensor management device 12; and map images of monitored areas.

FIG. 5 shows one example of the measurement result list K stored in the storage unit of the sensor management device according to the first embodiment of the present invention.

With reference to FIG. 5, a table TA10 which is one example of the measurement result list K shows the content of sensor information obtained from each sensor 11 by the sensor management device 12.

Specifically, the table TA10 shows: "identification information" and "measurement value" of each sensor 11 indicated by sensor information; and "obtainment time" of the sensor information obtained by the sensor management device 12.

The measurement result list K is updated every time the sensor management device 12 obtains new sensor information.

FIG. 6 shows one example of the position list P stored in the storage unit of the sensor management device according to the first embodiment of the present invention.

With reference to FIG. 6, a table TA20 which is one example of the position list P shows "identification information" of each sensor 11 and "position information" indicating the position in the monitored area of the sensor 11. Specifically, for example, the position information indicates the coordinates in the map image of a sensor icon Se.

As described above, the sensor management device 12 obtains position information of each sensor 11 through operation performed by the user. "N" is entered in the column of "position information" of any sensor 11 of which position information has not been obtained by the sensor management device 12.

In the column of "identification information" in the position list P, identification information of each sensor 11 is entered which is the transmission source of the sensor information having been obtained by the sensor management device 12, for example.

When the sensor management device 12 has obtained sensor information from a new sensor 11, the identification number of the sensor 11 is added to the position list P.

For example, in a case where the user has newly installed a sensor 11 in the monitored area, if the sensor management device 12 obtains sensor information from the sensor 11, the identification number of the sensor 11 is added in the column of "identification information" in the position list P. At this time, in the column of "position information" of the sensor in the position list P, "N" indicating that the position information thereof has not been obtained is entered.

Hereinafter, the sensor 11 of which identification information is not shown in the position list P, that is, the sensor 11 of which position information has not been obtained by the sensor management device 12, will also be referred to as unregistered sensor.

With respect to each sensor 11 of which position information is registered in the position list P, the sensor management device 12 performs control of displaying a corresponding sensor icon Se in the position display area De1 on the screen.

Meanwhile, with respect to each sensor 11 of which position information is not registered in the position list P, that is, each sensor 11 for which "N" is entered in the column of "position information", the sensor management device 12 performs control of displaying a corresponding identification number and a corresponding sensor icon Sn in the non-arrangement display area De3 on the screen.

Figure 7:
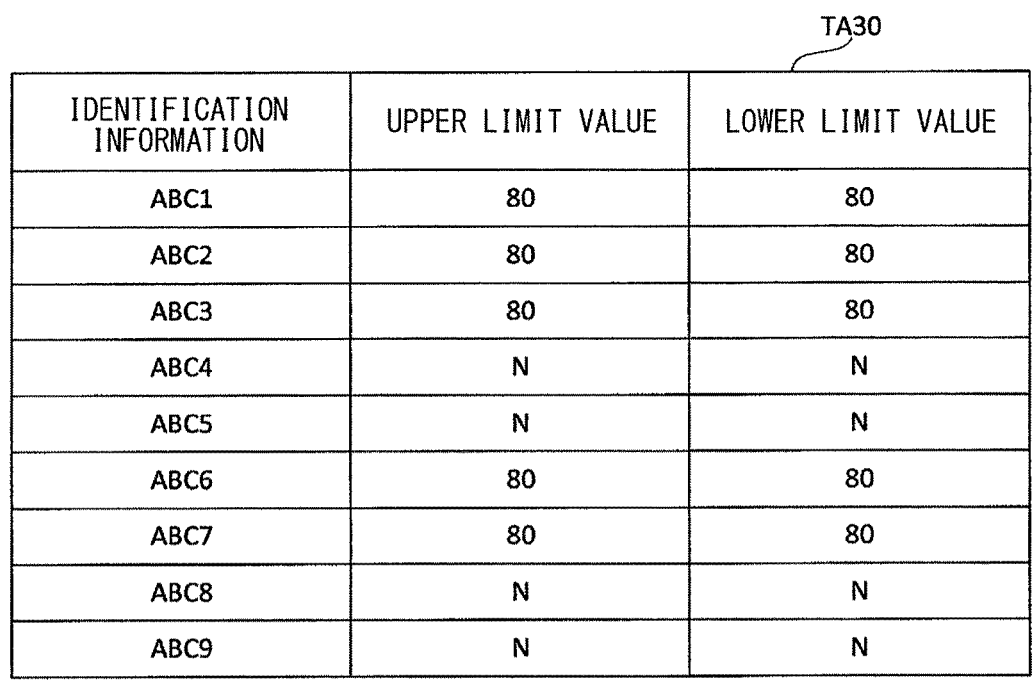
FIG. 7 shows one example of a normal range list T stored in the storage unit of the sensor management device according to the first embodiment of the present invention.

FIG. 7 shows one example of the normal range list T stored in the storage unit of the sensor management device according to the first embodiment of the present invention.

With reference to FIG. 7, a table TA30 which is one example of the normal range list T shows "identification information" of each sensor 11, and "upper limit value" and "lower limit value" for defining a normal range for the measurement value obtained by the sensor 11.

For example, if the measurement value obtained by a sensor 11 is included in the range from "lower limit value" to "upper limit value", the sensor management device 12 determines that there is no abnormality with respect to the sensor 11, i.e., that no abnormality has occurred in the monitoring target of the sensor 11.

The normal range list T is a list created by the sensor management device 12 on the basis of an operation performed by the user, for example.

Figure 8:
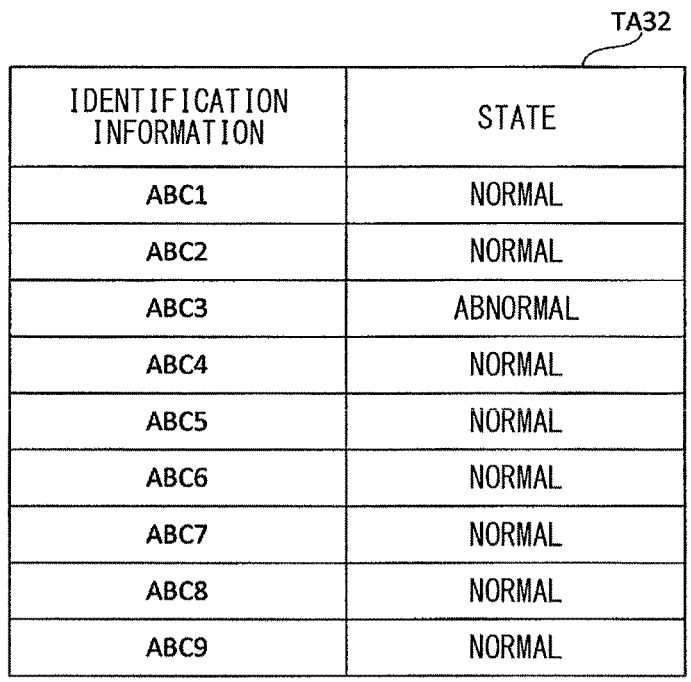
FIG. 8 shows one example of an abnormality presence/absence list U stored in the storage unit of the sensor management device according to the first embodiment of the present invention.

FIG. 8 shows one example of the abnormality presence/absence list U stored in the storage unit of the sensor management device according to the first embodiment of the present invention.

With reference to FIG. 8, a table TA32 which is one example of the abnormality presence/absence list U shows "identification information" of each sensor 11 and "state" of the monitoring target of the sensor 11. The state of the monitoring target of each sensor 11 is expressed as "normal" and "abnormal", for example.

The sensor management device 12 compares the measurement result list K shown in FIG. 5 with the normal range list T shown in FIG. 7, determines whether or not the measurement value of a sensor 11 is normal, i.e., whether or not an abnormality has occurred in the monitoring target of the sensor 11, and reflects the determination result in the abnormality presence/absence list U.

With reference to FIG. 4 again, the reception processing unit 21 obtains sensor information from a sensor 11 via the base station 14, and updates the measurement result list K stored in the storage unit 22, on the basis of the obtained sensor information.

The display control unit 26 performs control of displaying, on the display unit 13, position screen information indicating the positions of sensors, for example. At this time, the display control unit 26 performs control of displaying position screen information further indicating the position of the sensor management device 12, for example.

Specifically, on the basis of the position list P, the position information of each base station 14, the position information of the sensor management device 12, and the map image of the monitored area, which are stored in the storage unit 22, the processing unit 27 creates position screen information A1 indicating the display content of the position display area De1 shown in FIG. 2, for example.

In addition, the processing unit 27 creates button screen information A2 indicating the display content of the button display area De2 shown in FIG. 2, for example. In addition, on the basis of the position list P, the processing unit 27 creates non-arrangement screen information A3 indicating the display content of the non-arrangement display area De3 shown in FIG. 2, for example.

Then, the processing unit 27 outputs, to the display control unit 26, entire screen information Aa which includes the created position screen information A1, the created button screen information A2, and the created non-arrangement screen information A3.

The display control unit 26 transmits, to the display unit 13, the entire screen information Aa received from the processing unit 27. On the display unit 13, the content of the entire screen information Aa received from the display control unit 26 is displayed.

The detection unit 24 detects sensors 11. Specifically, for example, the detection unit 24 detects an unregistered sensor by comparing the measurement result list K and the position list P stored in the storage unit 22.

More specifically, in a case where identification information that is not included in the position list P is present in identification information included in the measurement result list K, the detection unit 24 detects, as identification information of an unregistered sensor, the identification information that is included in the measurement result list K and that is not included in the position list P.

When the detection unit 24 has detected identification information of an unregistered sensor, the detection unit 24 adds the identification information to the position list P.

In the position list P, "N" is entered in the column of "position information" that corresponds to the newly added identification information.

When the position of a sensor 11 detected by the detection unit 24 is not included in the position information, the display control unit 26 performs control of displaying the identification information of the sensor 11 detected by the detection unit 24, for example.

Specifically, for example, on the basis of the position list P to which the identification information of the unregistered sensor has been added by the detection unit 24, the processing unit 27 creates non-arrangement screen information B3 indicating the display content of the non-arrangement display area De3.

The processing unit 27 creates position screen information B1 indicating the display content of the position display area De1, and button screen information B2 indicating the display content of the button display area De2.

Then, the processing unit 27 outputs, to the display control unit 26, entire screen information Ba including the created position screen information B1, the created button screen information B2, and the created non-arrangement screen information B3.

The display control unit 26 transmits, to the display unit 13, the entire screen information Ba received from the processing unit 27. On the display unit 13, the content of the entire screen information Ba received from the display control unit 26 is displayed.

The operation unit 29 receives an operation performed on the sensor management device 12 by the user. For example, when the user has performed an operation for designating the position of a sensor 11, the operation unit 29 creates operation information A indicating the operation, and outputs the created operation information A to the operation obtaining unit 28.

Specifically, for example, when the user has performed an icon arranging operation with respect to a sensor icon Sn displayed in the non-arrangement display area De3 on the screen, the operation unit 29 creates operation information A indicating the content of the icon arranging operation, and outputs the created operation information A to the operation obtaining unit 28. The operation obtaining unit 28 obtains the operation information A for designating the position of the sensor 11 from the operation unit 29.

On the basis of the operation information A obtained by the operation obtaining unit 28, the display control unit 26 performs control of displaying position screen information indicating the position of the sensor 11.

Specifically, on the basis of the operation information A received from the operation unit 29, the operation obtaining unit 28 updates the position list P stored in the storage unit 22.

For example, the operation obtaining unit 28 confirms the content of the operation information A received from the operation unit 29, and recognizes the coordinates of the arrangement destination, of the sensor icon Sn in the map image, which has been specified when the user has performed the icon arranging operation with respect to the sensor icon Sn displayed in the non-arrangement display area De3.

Then, the operation obtaining unit 28 changes, from "N" to the coordinates, the content of the column of "position information" that corresponds to the sensor icon Sn in the position list P stored in the storage unit 22.

On the basis of the position list P stored in the storage unit 22, the processing unit 27 creates position screen information C1 indicating the display content of the position display area De1.

In addition, the processing unit 27 creates button screen information C2 indicating the display content of the button display area De2, and non-arrangement screen information C3 indicating the display content of the non-arrangement display area De3.

Then, the processing unit 27 outputs, to the display control unit 26, entire screen information Ca including the created position screen information C1, the created button screen information C2, and the created non-arrangement screen information C3.

The display control unit 26 transmits, to the display unit 13, the entire screen information Ca received from the processing unit 27. On the display unit 13, the content of the entire screen information Ca received from the display control unit 26 is displayed.

The abnormality detection unit 25 detects abnormalities of sensors. Specifically, the abnormality detection unit 25 compares the measurement result list K and the normal range list T which are stored in the storage unit, and detects an abnormality in the monitoring target of a sensor 11.

More specifically, for example, when the measurement value of a sensor 11 shown in the measurement result list K is outside the normal range of the measurement value shown in the normal range list T, it is determined that an abnormality has occurred in the monitoring target of the sensor 11.

When the abnormality detection unit 25 has determined that an abnormality has occurred in the monitoring target of the sensor 11, the abnormality detection unit 25 changes, from "normal" to "abnormal", the content of the column of "state" of the sensor 11 in the abnormality presence/absence list U stored in the storage unit 22.

The display control unit 26 sets the display mode for the position of the sensor 11 for which an abnormality has been detected by the abnormality detection unit 25, among the positions of the sensors 11 included in the position screen information, to a display mode that is different from the display mode for the positions of sensors for which no abnormality has been detected by the abnormality detection unit 25.

Specifically, for example, when, in the abnormality presence/absence list U stored in the storage unit 22, the content of the column of "state" of a sensor 11 that corresponds to the sensor icon Se11 displayed in the position display area De1 has been changed from "normal" to "abnormal", the processing unit 27 creates position screen information D1 indicating the display content of the position display area De1 shown in FIG. 3.

In addition, the processing unit 27 creates button screen information D2 indicating the display content of the button display area De2, and non-arrangement screen information D3 indicating the display content of the non-arrangement display area De3.

Then, the processing unit 27 outputs, to the display control unit 26, entire screen information Da including the created position screen information D1, the created button screen information D2, and the created non-arrangement screen information D3.

The display control unit 26 transmits, to the display unit 13, the entire screen information Da received from the processing unit 27. On the display unit 13, the content of the entire screen information Da received from the display control unit 26 is displayed.

The reception processing unit 21 performs control of displaying information regarding a designated sensor 11 among the sensors 11 of which positions are indicated by the position screen information.

Specifically, for example, when the user has clicked a sensor icon Se displayed in the position display area De1, the operation unit 29 creates operation information B indicating the content of the operation performed by the user, and outputs the created operation information B to the operation obtaining unit 28.

On the basis of the operation information B received from the operation unit 29, the operation obtaining unit 28 creates designated icon information indicating the sensor icon Se designated by the user, and outputs the created designated icon information to the processing unit 27.

When the processing unit 27 has received the designated icon information from the operation obtaining unit 28, the processing unit 27 confirms the measurement result list K and the abnormality presence/absence list U which are stored in the storage unit 22, for example.

Then, the processing unit 27 creates window screen information W for displaying: the measurement value of the sensor 11 that corresponds to the sensor icon Se indicated by the designated icon information; and the state of the monitoring target of the sensor 11, and outputs entire screen information Wa including the created window screen information W, to the display control unit 26.

The entire screen information Wa may or may not include position screen information indicating the display content of the position display area De1, button screen information indicating the display content of the button display area De2, and non-arrangement screen information indicating the display content of the non-arrangement display area De3.

The display control unit 26 transmits, to the display unit 13, the entire screen information Wa received from the processing unit 27. On the display unit 13, a window is displayed so as to overlap the screen shown in FIG. 2, in which window the measurement value of the sensor 11 that corresponds to the sensor icon Se clicked by the user, and the state of the monitoring target of the sensor 11 are displayed, for example.

The display control unit 26 updates the display of the identification information when a predetermined operation has been performed. Specifically, for example, when the user has clicked the button Bu2 indicated as "update" in the button display area De2, the operation unit 29 creates operation information C indicating the content of the operation performed by the user, and outputs the created operation information C to the operation obtaining unit 28.

On the basis of the operation information C received from the operation unit 29, the operation obtaining unit 28 creates update instruction information for instructing update of the non-arrangement list in the non-arrangement display area De3, and outputs the created update instruction information to the processing unit 27.

When the processing unit 27 has received the update instruction information from the operation obtaining unit 28, the processing unit 27 confirms the position list P stored in the storage unit 22, creates, on the basis of the position list P, non-arrangement screen information E3 indicating the display content of the non-arrangement display area De3, and outputs entire screen information Ea including the created non-arrangement screen information E3, to the display control unit 26.

The display control unit 26 transmits, to the display unit 13, the entire screen information Ea received from the processing unit 27. On the display unit 13, the content of the entire screen information Ea received from the display control unit 26 is displayed.

[Operation]

Next, operation at the time when the monitoring system according to the first embodiment of the present invention performs screen display processing is described.

Each device in the monitoring system 101 includes a computer, and an arithmetic processing unit such as CPU in the computer reads out a program including a part or all of steps in the following flow chart and sequence from a memory not shown, and executes the program. The programs for the plurality of devices can be installed from outside. The programs for the plurality of devices are each distributed in a state of being stored in a storage medium.

Figure 9:
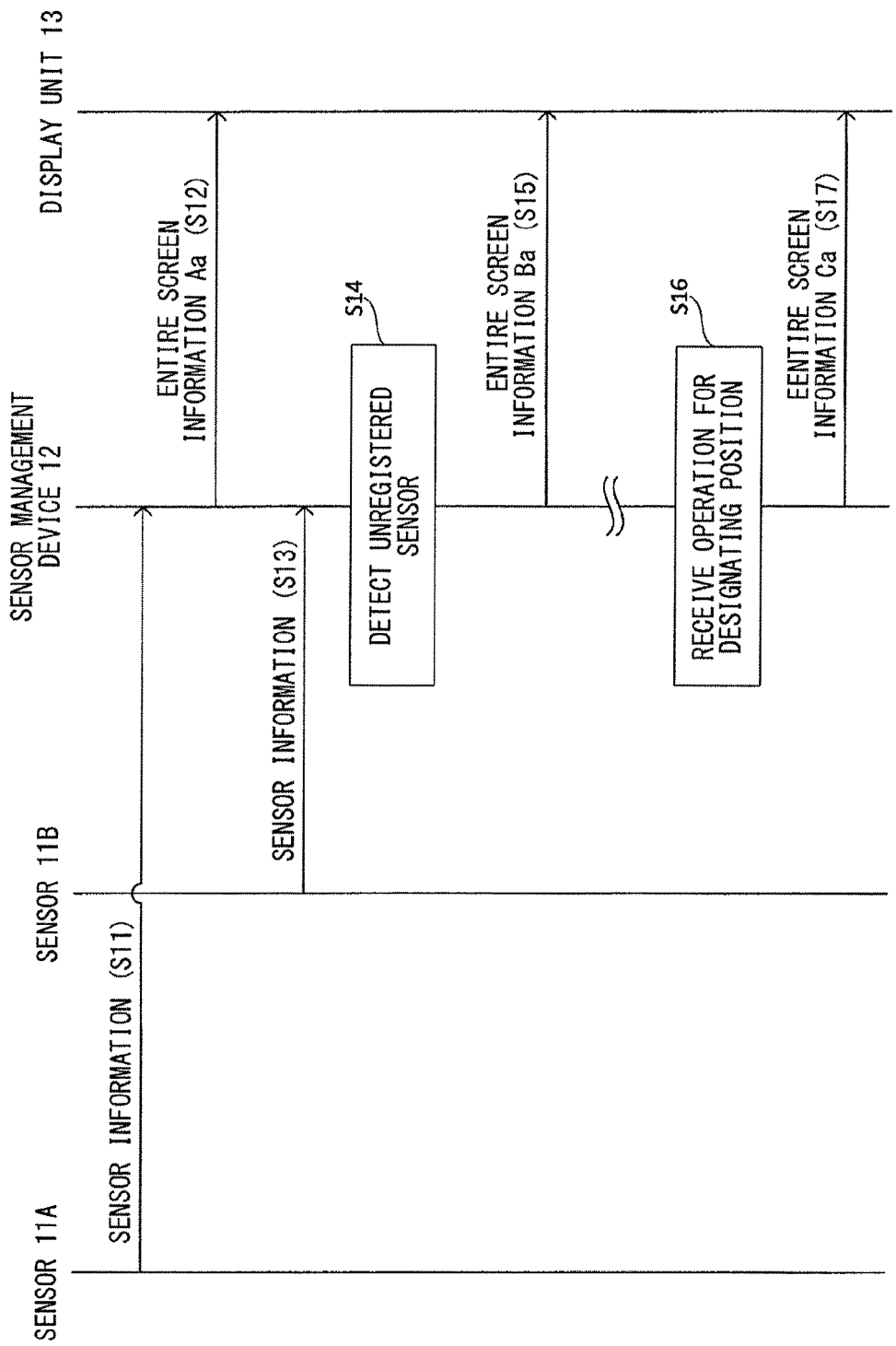
FIG. 9 shows one example the sequence of screen display processing performed in the monitoring system according to the first embodiment of the present invention.

FIG. 9 shows one example of the sequence of screen display processing performed in the monitoring system according to the first embodiment of the present invention.

With reference to FIG. 9, first, a sensor 11A periodically or not periodically transmits sensor information to the sensor management device 12 (step S11). The sensor 11A is a sensor 11 that corresponds to the sensor icon Se11 displayed in the position display area De1 shown in FIG. 2, for example.

Next, the sensor management device 12 receives the sensor information from the sensor 11A. The sensor management device 12 performs control of displaying position screen information indicating the position of the sensor 11A, on the display unit 13, for example.

Specifically, for example, the sensor management device 12 transmits the entire screen information Aa described above, to the display unit 13 (step S12). On the display unit 13, the content of the entire screen information Aa is displayed.

Here, a sensor 11B transmits sensor information to the sensor management device 12, for the first time, for example (step S13).

Next, the sensor management device 12 detects the sensor 11B as an unregistered sensor (step S14), and performs control of displaying identification information of the detected sensor 11B. Specifically, for example, the sensor management device 12 transmits the entire screen information Ba described above, to the display unit 13 (step S15). On the display unit 13, the content of the entire screen information Ba is displayed.

Next, for example, when the user has performed an operation for designating the position of a sensor 11, specifically, when the user has performed an icon arranging operation with respect to a sensor icon Sn displayed in the non-arrangement display area De3, the sensor management device 12 receives the content of the operation (step S16).

Next, on the basis of the received content of the above operation, the sensor management device 12 performs control of displaying position screen information indicating the position of the sensor 11. Specifically, for example, the sensor management device 12 transmits the entire screen information Ca described above, to the display unit 13 (step S17). On the display unit 13, the content of the entire screen information Ca is displayed.

Figure 10:
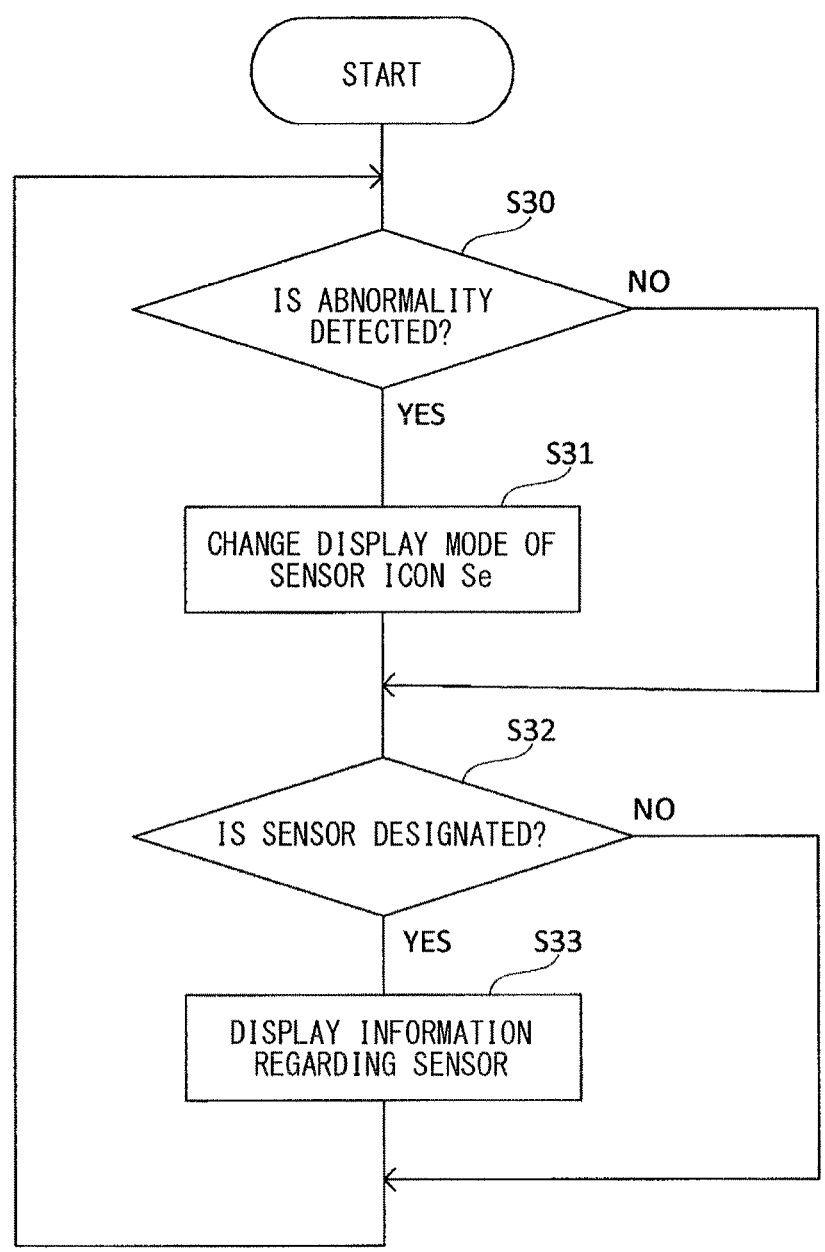
FIG. 10 is a flow chart showing one example of the procedure of the screen display processing performed by the sensor management device according to the first embodiment of the present invention.

FIG. 10 is a flow chart showing one example of the procedure of screen display processing performed by the sensor management device according to the first embodiment of the present invention.

With reference to FIG. 10, first, the sensor management device 12 detects abnormalities regarding sensors. Specifically, the sensor management device 12 determines whether or not an abnormality has occurred in the monitoring target of a sensor 11 that corresponds to each sensor icon Se displayed in the position display area De1 (step S30).

Next, when the sensor management device 12 has determined that an abnormality has occurred in the monitoring target of a sensor 11, i.e., when the sensor management device 12 has detected an abnormality regarding a sensor 11 (YES in step S30), the sensor management device 12 changes the display mode for the position of the sensor 11 displayed in the position display area De1, i.e., the display mode of the sensor icon Se that corresponds to the sensor 11 (step S31).

Specifically, for example, the sensor management device 12 transmits the entire screen information Da described above, to the display unit 13.

Next, the sensor management device 12 confirms whether or not a sensor 11 has been designated by the user (step S32). Specifically, the sensor management device 12 confirms whether or not a sensor icon Se has been clicked by the user in the position display area De1.

Next, when the sensor management device 12 has confirmed that a sensor 11 has been designated (YES in step S32), the sensor management device 12 performs control of displaying information regarding the sensor 11 (step S33). Specifically, for example, the sensor management device 12 transmits the entire screen information Wa described above, to the display unit 13.

Meanwhile, when the sensor management device 12 has not detected any abnormality of any sensor (NO in step S30), the sensor management device 12 does not perform the control of changing the display mode of a sensor icon Se, and confirms whether or not a sensor 11 has been designated by the user (step S32).

When no sensor 11 has been designated by the user (NO in step S32), the sensor management device 12 does not perform the control of displaying information regarding a sensor 11, and determines the presence/absence of an abnormality in the monitoring target of each sensor 11 again (step S30).

It should be noted that in the monitoring system 101 according to the first embodiment of the present invention, the display control unit 26 of the sensor management device 12 is configured to perform control of displaying, on the display unit 13, non-arrangement screen information indicating the identification information of sensors 11 detected by the detection unit 24 and the position screen information indicating the position of sensors 11. However, the present invention is not limited thereto.

Specifically, for example, the sensor management device 12 is connected to a terminal device via a network. The display control unit 26 of the sensor management device 12 transmits, to the terminal device, entire screen information including position screen information, button screen information, and non-arrangement screen information. The terminal device displays, on its own display unit, the entire screen information received from the sensor management device 12.

In the monitoring system 101 according to the first embodiment of the present invention, the sensor management device 12 is configured to perform control of displaying, in the non-arrangement display area De3 on the screen, identification information of a sensor 11 of which position information has not been obtained by the sensor management device 12, and a sensor icon that corresponds to the sensor 11. However, the present invention is not limited thereto.

For example, the sensor management device 12 may be configured to perform control of displaying, on the non-arrangement display area De3 on the screen, identification information of a base station 14 of which position information has not been obtained by the sensor management device, and an icon that corresponds to the base station 14.

In the monitoring system 101 according to the first embodiment of the present invention, each sensor icon displayed in the non-arrangement display area De3 is configured to be arranged on a map image through a drag-and-drop operation performed by the user. However, the present invention is not limited thereto.

For example, the sensor management device 12 may be configured to, upon receiving an input of coordinates in the map image from the user, arrange a target sensor icon at a place indicated by the coordinates in the map image.

In this case, the sensor management device 12 obtains the coordinates inputted by the user, as position information of the corresponding sensor 11. Specifically, the operation unit 29 of the sensor management device 12 outputs operation information indicating the coordinates inputted by user, to the operation obtaining unit 28. The operation obtaining unit 28 receives the operation information from the operation unit 29. On the basis of the operation information obtained by the operation obtaining unit 28, the display control unit 26 performs control of displaying position screen information indicating the position of the sensor 11.

Meanwhile, in a case state where the positions of sensors in a predetermined area are displayed on a screen by use of the technology described in PATENT LITERATURE 1, if a sensor of which position is unknown is included in the sensors, the position of the sensor is not displayed on the screen. In such a case, even if the user recognizes that there is an abnormality in the measurement value of the sensor, it is difficult for the user to move to the installation place of the sensor.

In contrast to this, in the sensor management device according to the first embodiment of the present invention, the display control unit 26 performs control of displaying position screen information indicating the positions of sensors 11. The detection unit 24 detects sensors 11. When the position of a sensor 11 detected by the detection unit 24 is not included in the position screen information, the display control unit 26 further performs control of displaying identification information of the sensor 11 detected by the detection unit 24.

As described above, through the configuration in which, when a sensor 11 of which position has not been ascertained by the sensor management device 12 has been detected, the identification information of the sensor 11 is displayed on the screen, the user can recognize on the screen the presence of the sensor 11 of which position has not been ascertained. Thus, the user can take measures necessary for ascertaining the position of the sensor 11, for example.

In addition, since the position of the sensor 11 is displayed on the screen, users other than the user who installed the sensor 11 can properly recognize the position, for example.

Therefore, in the sensor management device according to the first embodiment of the present invention, the position of each sensor can be appropriately managed.

In the sensor management device according to the first embodiment of the present invention, the operation obtaining unit (obtainment unit) 28 obtains operation information indicating an operation for designating the position of a sensor 11. The display control unit 26 performs control of displaying position screen information on the basis of the operation information obtained by the operation obtaining unit 28.

Through this configuration, the sensor management device 12 can recognize the position of a sensor 11, and can cause the recognized position of the sensor 11 to be displayed on the screen. For example, the position of a sensor 11 of which position has not been ascertained by the sensor management device 12 can be added to the screen.

In the sensor management device according to the first embodiment of the present invention, the abnormality detection unit 25 detects an abnormality regarding a sensor 11. The display control unit 26 sets the display mode for the position of the sensor 11 for which an abnormality has been detected by the abnormality detection unit 25, among the positions included in position screen information, to a display mode that is different from the display mode for the positions of sensors 11 for which no abnormality has been detected by the abnormality detection unit 25.

Through this configuration, in a case where there is an abnormality in the measurement result of a sensor 11, the user can easily recognize the position of the sensor 11.

Accordingly, the user can promptly move to the installation place of the sensor 11, and can directly confirm the state of the monitoring target monitored by the sensor 11.

In the sensor management device according to the first embodiment of the present invention, the display control unit 26 further performs control of displaying information regarding a designated sensor 11 among the sensors 11 of which positions are indicated by position screen information.

Through this configuration, the user can easily confirm the measurement result and the like of the desired sensor 11.

In the sensor management device according to the first embodiment of the present invention, the display control unit 26 performs control of displaying position screen information further indicating the position of the sensor management device 12.

Through this configuration, for example, in a case where the user is near the sensor management device 12, if the user confirms the positional relationship between a sensor 11 and the sensor management device 12 displayed on the screen, the user can more easily recognize the position of the sensor 11.

In the sensor management device according to the first embodiment of the present invention, the display control unit 26 updates the display of identification information when a predetermined operation has been performed.

Through this configuration, for example, the frequency of updating the display of identification information by the sensor management device 12 can be reduced, and thus, the processing load of the sensor management device 12 can be reduced.

Next, another embodiment of the present invention is described with reference to the drawings. In the drawings, the same or corresponding parts are denoted by the same reference signs, and description thereof is not repeated.

Second Embodiment

The present embodiment relates to a monitoring system that detects movement of a sensor, when compared with the monitoring system according to the first embodiment.

Except the contents described below, the monitoring system according to the present embodiment is the same as the monitoring system according to the first embodiment.

[Configuration and Basic Operation]

Figure 11:
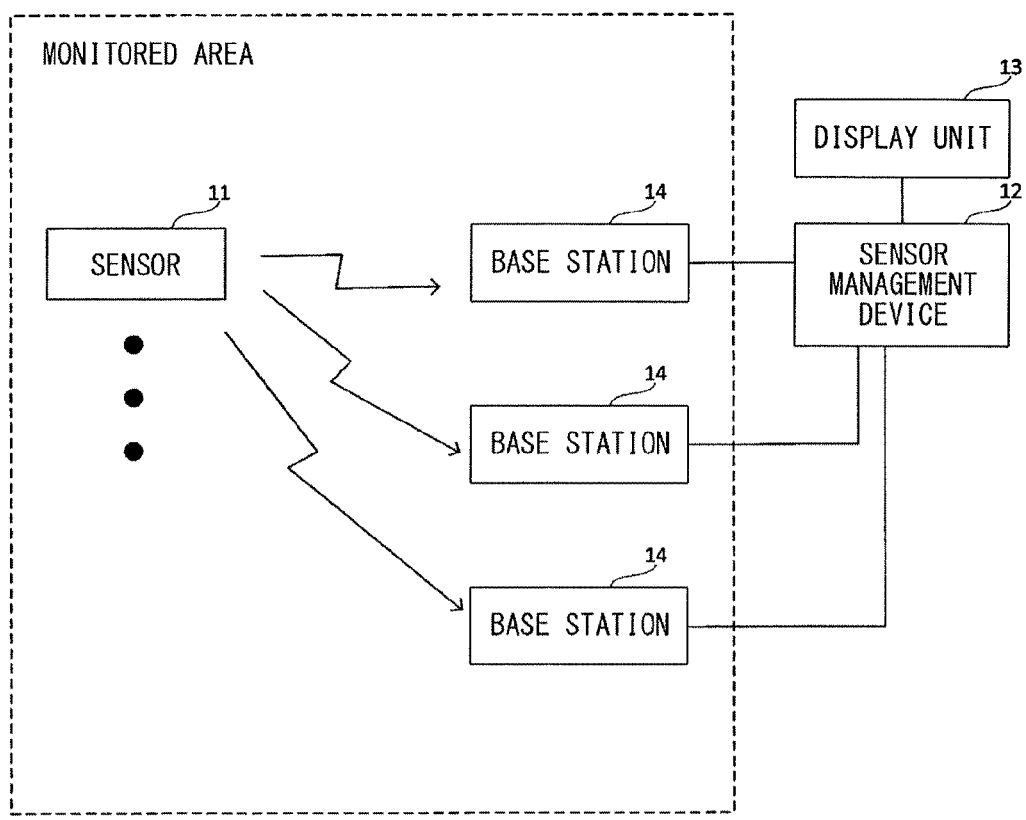
FIG. 11 shows a configuration of a monitoring system according to a second embodiment of the present invention.

FIG. 11 shows s a configuration of a monitoring system according to a second embodiment of the present invention.

With reference to FIG. 11, a monitoring system 102 includes: a plurality of sensors 11; the base stations 14A, 14B, 14C; the sensor management device 12; and the display unit 13. Hereinafter, each of the base stations 14A, 14B, 14C will also be referred to as base station 14.

Each sensor 11 is provided in a monitored area such as a plant or a hospital, for example, and performs measurement regarding a monitoring target, such as measurement of temperature, humidity, or electric current of the monitoring target, for example.

Each sensor 11 creates sensor information which includes: identification information of the sensor 11 itself; and measurement result information indicating a measurement result, and transmits the created sensor information to the base stations 14A, 14B, 14C through wireless communication.

When each base station 14 receives the sensor information from a sensor 11, the base station 14 adds, to the sensor information, radio wave intensity information indicating the intensity, of the radio wave from the sensor 11, at the time of the reception of the sensor information. Then, the base station 14 transmits the sensor information having the radio wave intensity information added thereto, to the sensor management device 12 through wired communication, for example.

In a case where a sensor 11 arranged in a monitored area has been moved by the user, the sensor management device 12 detects movement of the sensor 11 and further estimates the movement destination, on the basis of the sensor information received from each base station 14, for example.

Then, the sensor management device 12 performs control of displaying the estimated movement destination of the sensor 11 on the screen.

Figure 12:
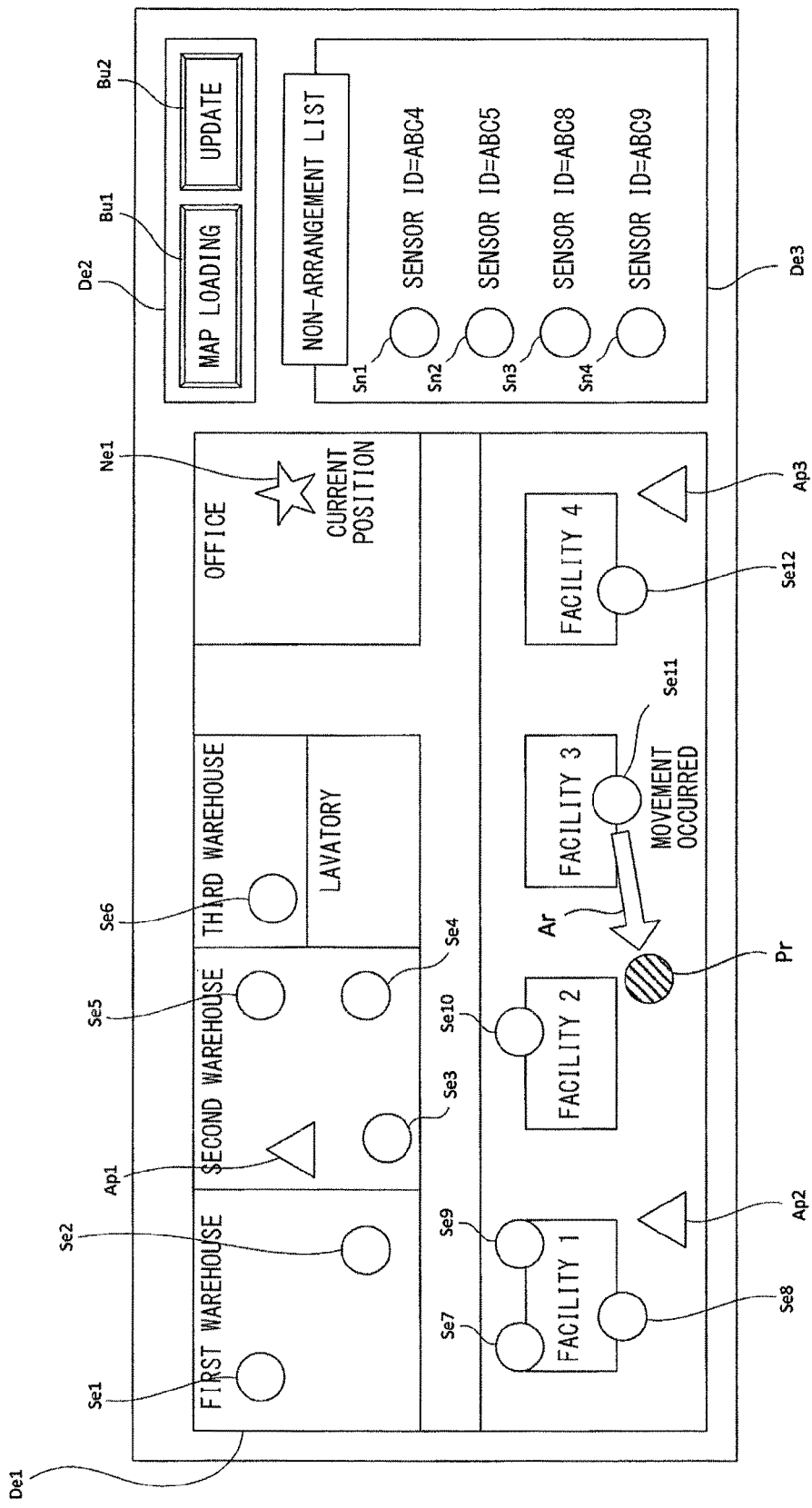
FIG. 12 shows one example of a screen displayed on the display unit in the monitoring system according to the second embodiment of the present invention.

FIG. 12 shows one example of the screen displayed on the display unit in the monitoring system according to the second embodiment of the present invention.

FIG. 12 shows a screen that is displayed on the display unit 13 when the sensor management device 12 has detected movement of a sensor 11.

With reference to FIG. 12, in the position display area De1, the characters "movement occurred" are attached to the sensor icon Se11, which is the sensor icon Se corresponding to the sensor 11 of which movement has been detected. In addition, a sensor icon Pr indicating the movement destination, of the sensor 11, estimated by the sensor management device 12 is displayed in the position display area De1. In the position display area De1, an arrow Ar extending from the sensor icon Se11 to the sensor icon Pr is displayed.

By performing this display, the sensor management device 12 notifies the user that the sensor 11 has been moved, and an approximate movement destination of the sensor 11.

Figure 13:
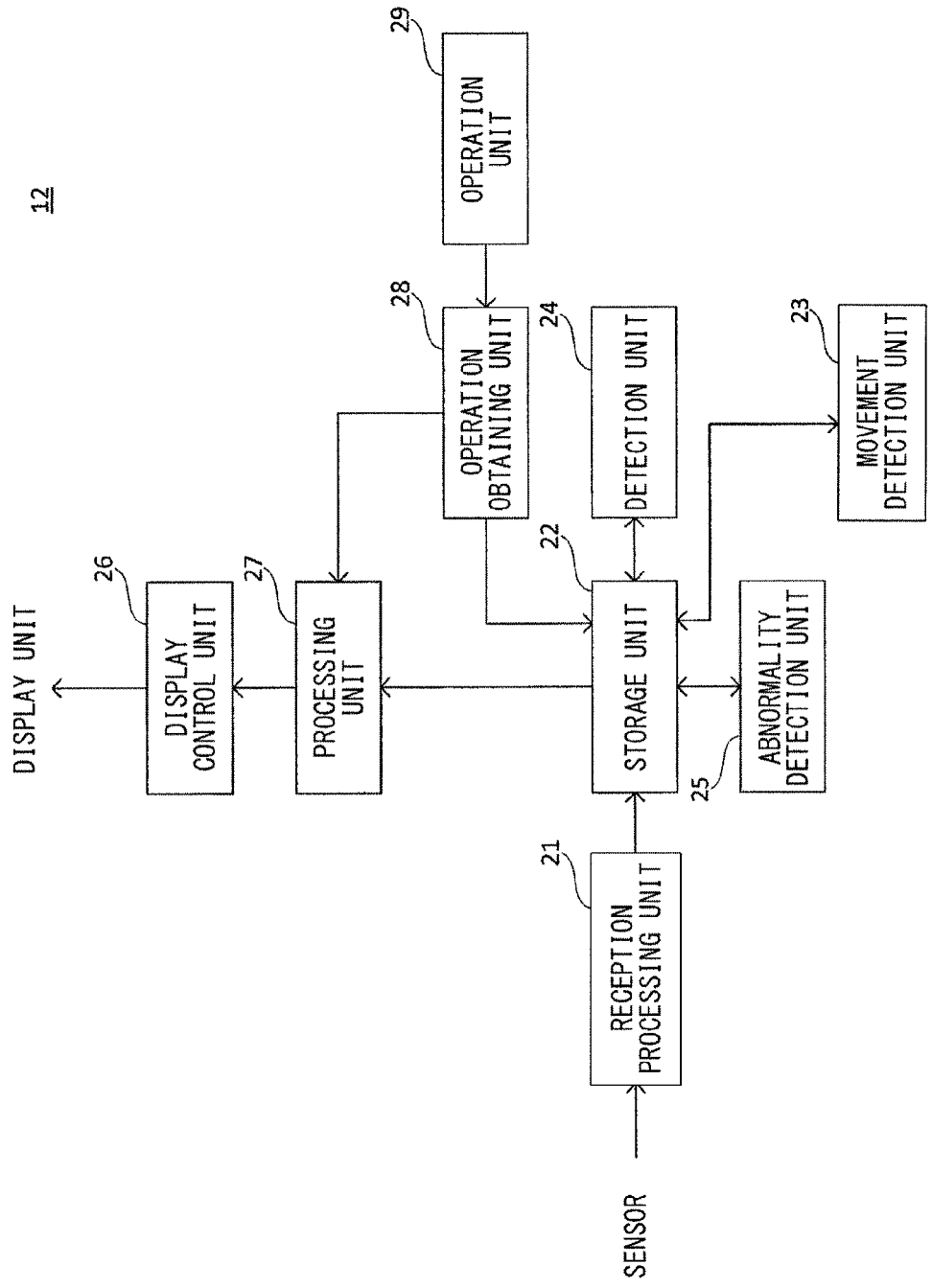
FIG. 13 shows a part of a configuration of a sensor management device according to the second embodiment of the present invention.

FIG. 13 shows a part of a configuration of the sensor management device according to the second embodiment of the present invention.

With reference to FIG. 13, the sensor management device 12 includes the reception processing unit 21, the storage unit 22, a movement detection unit 23, the detection unit 24, the abnormality detection unit 25, the display control unit 26, the processing unit 27, the operation obtaining unit (obtainment unit) 28, and the operation unit 29. Similarly to the reception processing unit 21 and the like, the movement detection unit 23 is implemented by a processor that performs digital signal processing, such as CPU or MPU.

That is, compared with the sensor management device 12 shown in FIG. 4, this sensor management device 12 further includes the movement detection unit 23. The reception processing unit 21, the storage unit 22, the detection unit 24, the display control unit 26, and the processing unit 27 of the sensor management device 12 further perform operations described below in addition to the operations described in the first embodiment.

The storage unit 22 has stored therein various types of information necessary for the sensor management device 12 to perform display processing for the screen.

Specifically, the storage unit 22 has stored therein, for example: the measurement result list K; the position list P; the normal range list T; the abnormality presence/absence list U; the position information indicating the position of each base station 14; the position information indicating the position of the sensor management device 12; and a radio wave intensity list M and an average intensity list Ma which are created on the basis of the sensor information.

FIG. 14 shows one example of the radio wave intensity list M stored in the storage unit of the sensor management device according to the second embodiment of the present invention.

With reference to FIG. 14, a table TA60 which is one example of the radio wave intensity list M shows radio wave intensity information added to the sensor information obtained by the sensor management device 12.

Specifically, the table TA60 shows: "identification information" of each sensor 11 which is the transmission source of sensor information; base station 14 through which the sensor information has been transmitted; "radio wave intensity" which is the content of the radio wave intensity information added to the sensor information at the base station 14; and "obtainment time" which is the time of obtainment of the sensor information by the sensor management device 12.

The radio wave intensity list M is updated every time the sensor management device 12 obtains new sensor information from each base station 14.

FIG. 15 shows one example of the average intensity list Ma stored in the storage unit of the sensor management device according to the second embodiment of the present invention.

With reference to FIG. 15, a table TA62 which is one example of the average intensity list Ma shows "identification information" of each sensor 11, and the average value of the intensity at each base station 14 of the radio wave outputted from the sensor 11.

The sensor management device 12 creates the average intensity list Ma on the basis of the radio wave intensity list M shown in FIG. 14.

With reference to FIG. 13 again, the reception processing unit 21 obtains sensor information from a sensor 11 via each base station 14, and updates the radio wave intensity list M stored in the storage unit 22 on the basis of the obtained sensor information.

The movement detection unit 23 updates the average intensity list Ma on the basis of the radio wave intensity list M. The movement detection unit 23 detects movement of each sensor 11. Specifically, when a sensor 11 in the monitored area has been moved by the user, for example, the movement detection unit 23 detects that the sensor 11 has been moved.

More specifically, for example, the movement detection unit 23 compares the radio wave intensity list M and the average intensity list Ma which are stored in the storage unit 22, and if the intensity at each base station 14 of the radio wave outputted from a sensor 11 is deviated from the average value of the intensity by not less than a predetermined value, the movement detection unit 23 determines that the sensor 11 has been moved.

When the movement detection unit 23 has determined that the sensor 11 has been moved, the movement detection unit 23 estimates the movement destination of the sensor 11 on the basis of the radio wave intensity list M, for example.

The movement detection unit 23 creates movement destination information indicating the estimated movement destination of the sensor 11, and saves the created movement destination information in the storage unit 22.

The display control unit 26 sets the display mode for the position of the sensor of which movement has been detected by the movement detection unit 23, among the positions of the sensors 11 included in position screen information, to a display mode that is different from the display mode for the positions of sensors 11 of which movement has not been detected by the movement detection unit 23.

Specifically, the display control unit 26 performs control of displaying the display mode of the sensor icon Se of the sensor 11 of which movement has been detected by the movement detection unit 23 among the sensor icons Se displayed in the position display area De1, in a display mode that is different from the display mode of the sensor icons Se of sensors 11 of which movement has not been detected.

At this time, the display control unit 26 performs control of displaying position screen information indicating the movement origin and the movement destination of the sensor 11 of which movement has been detected, for example.

Specifically, for example, when the movement destination information of the sensor 11 that corresponds to the sensor icon Se11 displayed in the position display area De1 has been saved in the storage unit 22, the processing unit 27 creates position screen information F1 indicating the display content of the position display area De1 shown in FIG. 12 on the basis of the movement destination information.

The processing unit 27 creates button screen information F2 indicating the display content of the button display area De2 shown in FIG. 12, and non-arrangement screen information F3 indicating the display content of the non-arrangement display area De3 shown in FIG. 12, for example.

Then, the processing unit 27 outputs, to the display control unit 26, entire screen information Fa including the created position screen information F1, the created button screen information F2, and the created non-arrangement screen information F3.

The display control unit 26 transmits, to the display unit 13, the entire screen information Fa received from the processing unit 27, for example. On the display unit 13, the content of the entire screen information Fa received from the display control unit 26 is displayed.

[Operation]

Next, operation at the time when the monitoring system according to the second embodiment of the present invention performs screen display processing is described.

Each device in the monitoring system 102 includes a computer, and an arithmetic processing unit such as CPU in the computer reads out a program including a part or all of steps in the following flow chart and sequence from a memory not shown, and executes the program.

The programs of the plurality of devices can be installed from outside. The programs for the plurality of devices are each distributed in a state of being stored in a storage medium.

Figure 16:
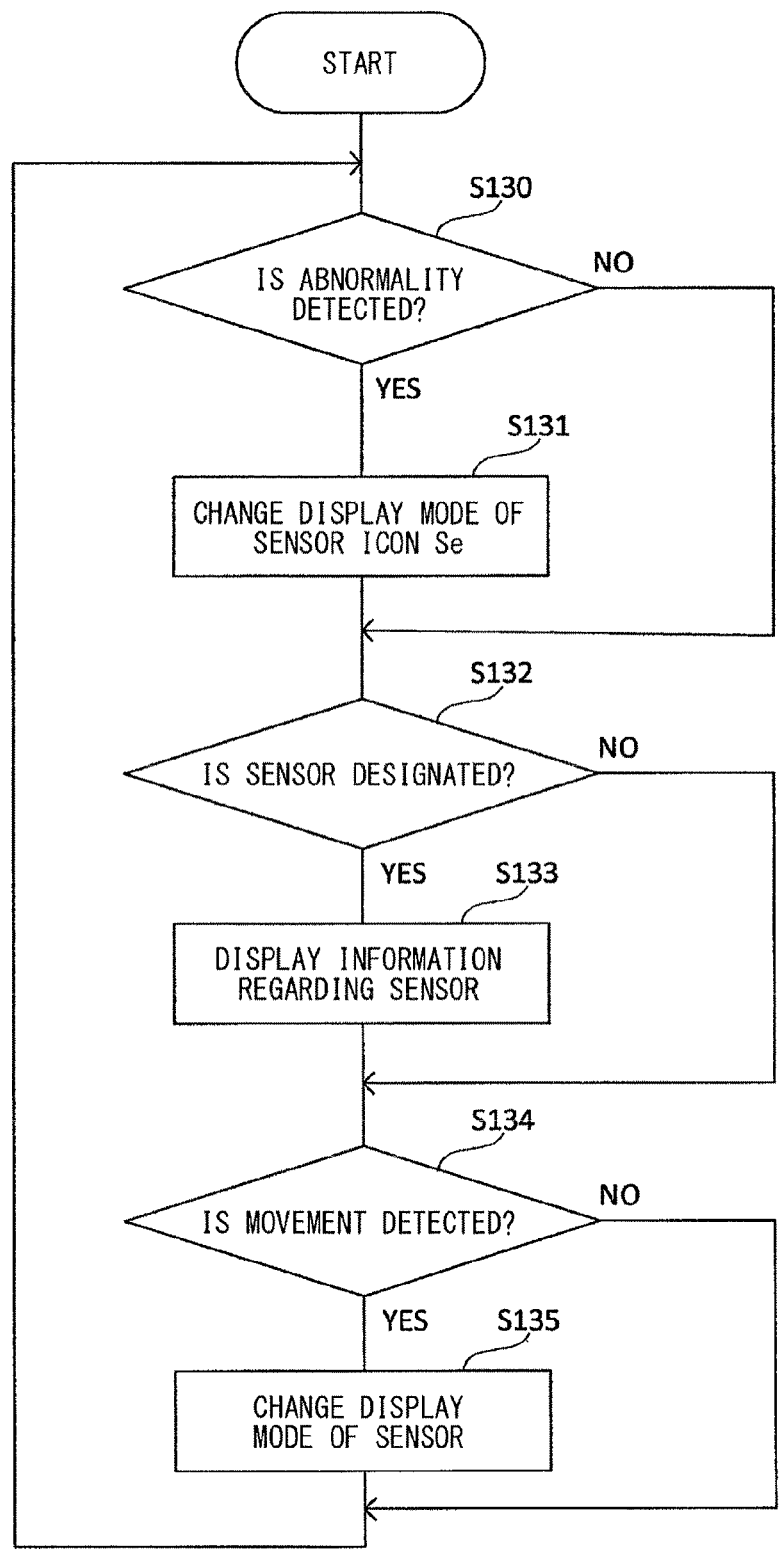
FIG. 16 is a flow chart showing one example of the procedure of screen display processing performed by the sensor management device according to the second embodiment of the present invention.

FIG. 16 is a flow chart showing one example of the procedure of screen display processing performed by the sensor management device according to the second embodiment of the present invention.

With reference to FIG. 16, first, the sensor management device 12 detects abnormalities regarding sensors. Specifically, the sensor management device 12 determines whether or not an abnormality has occurred in the monitoring target of a sensor 11 that corresponds to each sensor icon Se displayed in the position display area De1 (step S130).

Next, when the sensor management device 12 has determined that an abnormality has occurred in the monitoring target of the sensor 11, i.e., when the sensor management device 12 has detected an abnormality regarding the sensor 11 (YES in step S130), the sensor management device 12 changes the display mode for the position of the sensor 11 displayed in the position display area De1, i.e., the display mode of the sensor icon Se that corresponds to the sensor 11 (step S131).

Specifically, for example, the sensor management device 12 transmits the entire screen information Da described above, to the display unit 13.

Next, the sensor management device 12 confirms whether or not a sensor 11 has been designated by the user (step S132). Specifically, the sensor management device 12 confirms whether or not a sensor icon Se has been clicked by the user in the position display area De1.

Next, when the sensor management device 12 has confirmed that a sensor 11 has been designated (YES in step S132), the sensor management device 12 performs control of displaying information regarding the sensor 11 (step S133). Specifically, the sensor management device 12 transmits the entire screen information Wa described above, to the display unit 13.

Next, the sensor management device 12 determines whether or not a sensor 11 has been moved (step S134).

Next, when the sensor management device 12 has determined that a sensor 11 has been moved, i.e., when the sensor management device 12 has detected movement of a sensor 11 (YES in step S134), the sensor management device 12 changes the display mode of the sensor icon Se that corresponds to the sensor 11 (step S135). At this time, the sensor management device 12 shows the movement destination of the sensor 11 on the screen.

Specifically, the sensor management device 12 transmits the entire screen information Fa described above, to the display unit 13, for example.

Meanwhile, when the sensor management device 12 has not detected any abnormality of any sensor (NO in step S130), the sensor management device 12 does not perform the control of changing the display mode of a sensor icon Se, and confirms whether or not a sensor 11 has been designated by the user (step S132).

When no sensor 11 has been designated by the user (NO in step S132), the sensor management device 12 does not perform the control of displaying information regarding a sensor 11, and determines whether or not a sensor 11 has been moved (step S134).

When the sensor management device 12 has determined that no sensor 11 has been moved (NO in step S134), the sensor management device 12 does not change the display mode of the sensor icon Se, and determines the presence/absence of an abnormality in the monitoring target of each sensor 11 again (step S130).

It should be noted that the sensor management device 12 according to the second embodiment of the present invention is configured to detect movement of a sensor 11 on the basis of the intensity at each base station 14 of the radio wave outputted from the sensor 11. However, the present invention is not limited thereto.

For example, the sensor management device 12 may be configured to detect movement of a sensor 11 on the basis of the difference in reception times at the respective base stations 14 of the same sensor information transmitted by a sensor 11. Alternatively, the sensor management device 12 may be configured to detect movement of a sensor 11 on the basis of the distance between the sensor 11 and the respective base stations 14, the distance being calculated from the time periods needed from transmission of the sensor information by the sensor 11 to the reception thereof by the respective base stations 14.

As described above, in the sensor management device according to the second embodiment of the present invention, the movement detection unit 23 detects movement of a sensor 11. The display control unit 26 sets the display mode for the position of the sensor 11 of which movement has been detected by the movement detection unit 23, among the positions included in position screen information, to a display mode that is different from the display mode for the positions of sensors 11 of which movement has not been detected by the movement detection unit 23.

Through this configuration, for example, when a user has moved a sensor 11, other users can easily recognize that the sensor 11 has been moved.

In the sensor management device according to the second embodiment of the present invention, the display control unit 26 performs control of displaying position screen information further indicating the movement origin and the movement destination of the sensor 11.

Through this configuration, the user can recognize the detailed content of the movement of the sensor 11.

Since the other configurations and operations are the same as those in the monitoring system according to the first embodiment, detailed description thereof is not repeated here.

It should be understood that the above embodiments are merely illustrative and not restrictive in all aspects. The scope of the present invention is defined by the scope of the claims rather than the above description, and is intended to include meaning equivalent to the scope of the claims and all modifications within the scope.

The above description includes the features in the additional note below.

ADDITIONAL NOTE

A sensor management device comprising:
a display control unit configured to perform control of displaying position screen information indicating positions of sensors; and
a detection unit configured to detect a sensor, wherein
when a position of the sensor detected by the detection unit is not included in the position screen information, the display control unit further performs control of displaying identification information of the sensor detected by the detection unit,
the display control unit performs control of displaying, as the position screen information, an image showing a map of a predetermined area in which the sensor is arranged and an icon indicating the position of the sensor in the predetermined area,
the sensor management device further comprises
a reception processing unit configured to obtain sensor information transmitted from the sensor and including the identification information of the sensor, and
the detection unit detects the sensor on the basis of the sensor information obtained by the reception processing unit.

REFERENCE SIGNS LIST

11, 11A, 11B sensor
12 sensor management device
13 display unit
14, 14A, 14B, 14C base station
21 reception processing unit
22 storage unit
23 movement detection unit
24 detection unit
25 abnormality detection unit
26 display control unit
27 processing unit
28 operation obtaining unit
29 operation unit
101, 102 monitoring system

The invention claimed is:
1. A sensor management device comprising:
a display control unit configured to perform control of displaying position screen information indicating positions of sensors of which position information has been obtained; and
a detection unit configured to detect a sensor, wherein
when position information of the sensor detected by the detection unit has not been obtained, the display control unit further performs control of displaying identification information of the sensor detected by the detection unit, in a non-arrangement display area on a screen, and the display control unit updates the non-arrangement display area on the basis of predetermined information indicating whether or not the position information of the sensor detected by the detection unit has been obtained.

2. The sensor management device according to claim 1, further comprising
an obtainment unit configured to obtain operation information indicating an operation for designating a position of an unregistered sensor which is a sensor of which position information has not been obtained, wherein
the display control unit obtains the position information of the unregistered sensor on the basis of the operation information obtained by the obtainment unit, and performs control of displaying the position screen information further indicating the position of the unregistered sensor on the basis of the obtained position information.

3. The sensor management device according to claim 1, further comprising
an abnormality detection unit configured to detect an abnormality of the sensor, wherein the display control unit sets a display mode for a position of the sensor for which the abnormality has been detected by the abnormality detection unit, among the positions included in the position screen information, to the display mode that is different from the display mode for positions of sensors for which no abnormality has been detected by the abnormality detection unit.

4. The sensor management device according to claim 1, further comprising
a movement detection unit configured to detect movement of the sensor, wherein the display control unit sets a display mode for a position of the sensor of which movement has been detected by the movement detection unit, among the positions included in the position screen information, to a display mode that is different from the display mode for positions of sensors of which movement has not been detected by the movement detection unit.

5. The sensor management device according to claim 4, wherein
the display control unit performs control of displaying the position screen information further indicating a movement origin and a movement destination of the sensor.

6. The sensor management device according to claim 1, wherein
the display control unit further performs control of displaying information regarding a designated sensor among the sensors of which positions are indicated by the position screen information.

7. The sensor management device according to claim 1, wherein
the display control unit performs control of displaying the position screen information further indicating a position of the sensor management device.

8. The sensor management device according to claim 1, wherein
the display control unit updates the display of the identification information when a predetermined operation has been performed.

9. The sensor management device according to claim 1, wherein the sensor management device obtains sensor information transmitted from the sensor, the sensor information includes identification information of the sensor, when the sensor management device has obtained sensor information from a new sensor, the sensor management device updates the predetermined information to a content which allows recognition that position information corresponding to the identification information included in the obtained sensor information has not been obtained, and
when the sensor management device has received an operation for designating the position of the sensor that corresponds to the identification information displayed in the non-arrangement display area, the sensor management device updates the predetermined information to the content which allows recognition that position information corresponding to the identification information has been obtained.

10. The sensor management device according to claim 9, wherein the sensor management device has stored therein the predetermined information that includes correspondence relation between the identification information and the position information, and
when the correspondence relation regarding the identification information included in the obtained sensor information is not included in the predetermined information, the sensor management device updates the predetermined information to the content which allows recognition that the position information corresponding to the identification information has not been obtained.

11. The sensor management device according to claim 1, wherein
the sensor management device obtains sensor information transmitted from the sensor, and
the display control unit performs control of displaying the identification information included in the sensor information.

12. The sensor management device according to claim 11, wherein
the sensor information includes the identification information and a measurement result of the sensor, and
the display control unit performs control of displaying the identification information and the measurement result included in the sensor information.

13. A sensor management method to be performed in a sensor management device, the sensor management method comprising the steps of:
performing control of displaying position screen information indicating positions of sensors of which position information has been obtained;
detecting a sensor; and
performing, when position information of the detected sensor has not been obtained, control of displaying identification information of the detected sensor, in a non-arrangement display area on a screen; and
updating the non-arrangement display area on the basis of predetermined information indicating whether or not the position information of the detected sensor has been obtained.

14. A non-transitory computer readable storage medium storing a sensor management program to be used in a sensor management device, the sensor management program causing a computer to perform the steps of:
performing control of displaying position screen information indicating positions of sensors of which position information has been obtained;
detecting a sensor; and
performing, when position information of the detected sensor has not been obtained, control of displaying identification information of the detected sensor, in a non-arrangement display area on a screen; and updating the non-arrangement display area on the basis of predetermined information indicating whether or not the position information of the detected sensor has been obtained.

* * * * *